United States Patent
Kumakura et al.

(10) Patent No.: US 11,203,288 B2
(45) Date of Patent: Dec. 21, 2021

(54) LIGHTING CONTROL DEVICE AND METHOD OF VEHICULAR LAMP, AND VEHICULAR LAMP SYSTEM

(71) Applicant: STANLEY ELECTRIC CO., LTD., Tokyo (JP)

(72) Inventors: Akihisa Kumakura, Tokyo (JP); Yasushi Kita, Tokyo (JP); Takako Kimura, Tokyo (JP); Wataru Nakashima, Tokyo (JP); Shuto Oyama, Tokyo (JP); Kouki Kudo, Tokyo (JP); Hidetaka Okada, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/065,730

(22) Filed: Oct. 8, 2020

(65) Prior Publication Data
US 2021/0107399 A1  Apr. 15, 2021

(30) Foreign Application Priority Data

Oct. 9, 2019 (JP) .............................. JP2019-186105

(51) Int. Cl.
*B60Q 1/38* (2006.01)
*H05B 47/155* (2020.01)
*H05B 45/10* (2020.01)
*H05B 47/165* (2020.01)
*H05B 47/16* (2020.01)

(52) U.S. Cl.
CPC .............. *B60Q 1/38* (2013.01); *H05B 45/10* (2020.01); *H05B 47/155* (2020.01); *H05B 47/16* (2020.01); *H05B 47/165* (2020.01)

(58) Field of Classification Search
CPC ........ B60Q 1/346; B60Q 1/38; H05B 47/165; H05B 47/155; H05B 47/16; H05B 45/10
See application file for complete search history.

(56) References Cited

U.S. PATENT DOCUMENTS

| | | | |
|---|---|---|---|
| 9,586,521 B2 * | 3/2017 | Lee | B60Q 1/38 |
| 10,814,777 B2 * | 10/2020 | Na | H05B 47/155 |
| 2005/0062597 A1 * | 3/2005 | Su | B60Q 1/38 340/475 |

(Continued)

FOREIGN PATENT DOCUMENTS

| | | |
|---|---|---|
| JP | H07-335002 A | 12/1995 |
| JP | 2014-229510 A | 12/2014 |

*Primary Examiner* — Daniel D Chang
(74) *Attorney, Agent, or Firm* — Kenealy Vaidya LLP

(57) ABSTRACT

A lighting control device is capable of further enhancing the impression of direction indication due to the movement of light when performing sequential winker control. The lighting control device performs lighting control of a vehicular lamp including a plurality of light-emitting parts, and includes processor circuitry configured to perform controls to repeat a lighting cycle including turning on the plurality of light-emitting parts that have been turned off and maintaining a lighting state of all the light emitting parts, then sequentially dimming at least two or more of the light-emitting parts in a predetermined direction with a time difference, and thereafter turning off the plurality of light-emitting parts and maintaining a lights-out state of all the light-emitting parts.

14 Claims, 6 Drawing Sheets

(56) References Cited

U.S. PATENT DOCUMENTS

2012/0326606 A1* 12/2012 Rice .................. B60Q 1/38
315/77
2013/0127612 A1* 5/2013 Stadler .................. B60Q 1/34
340/465

* cited by examiner

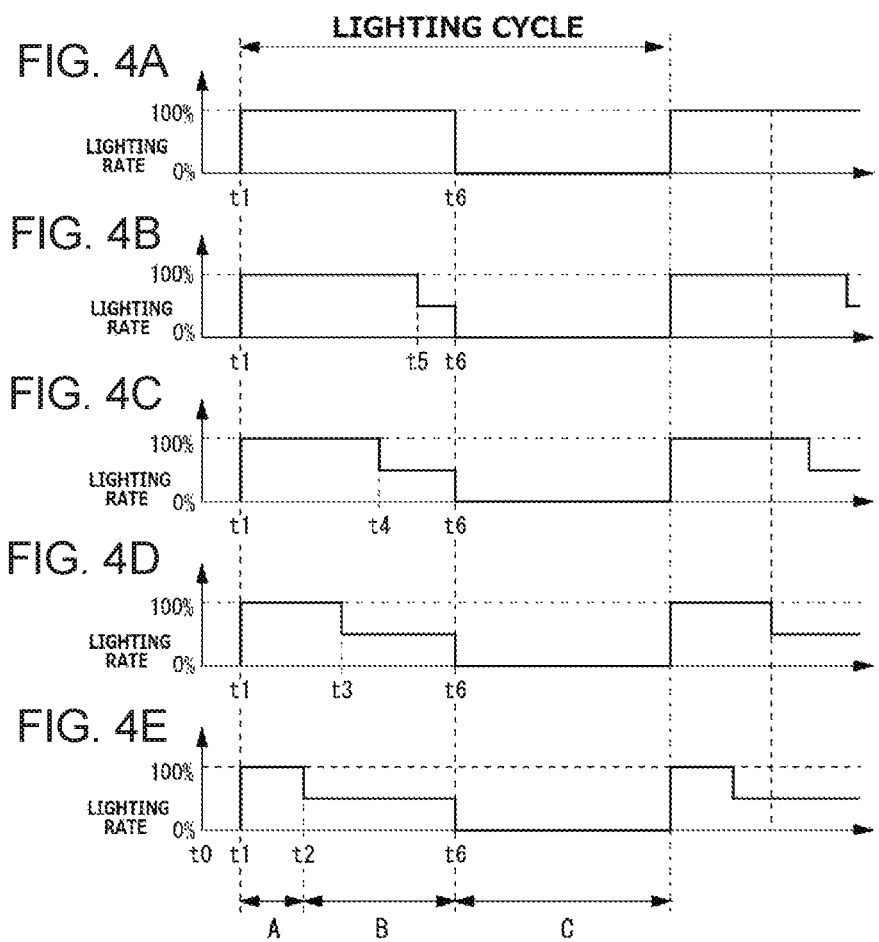

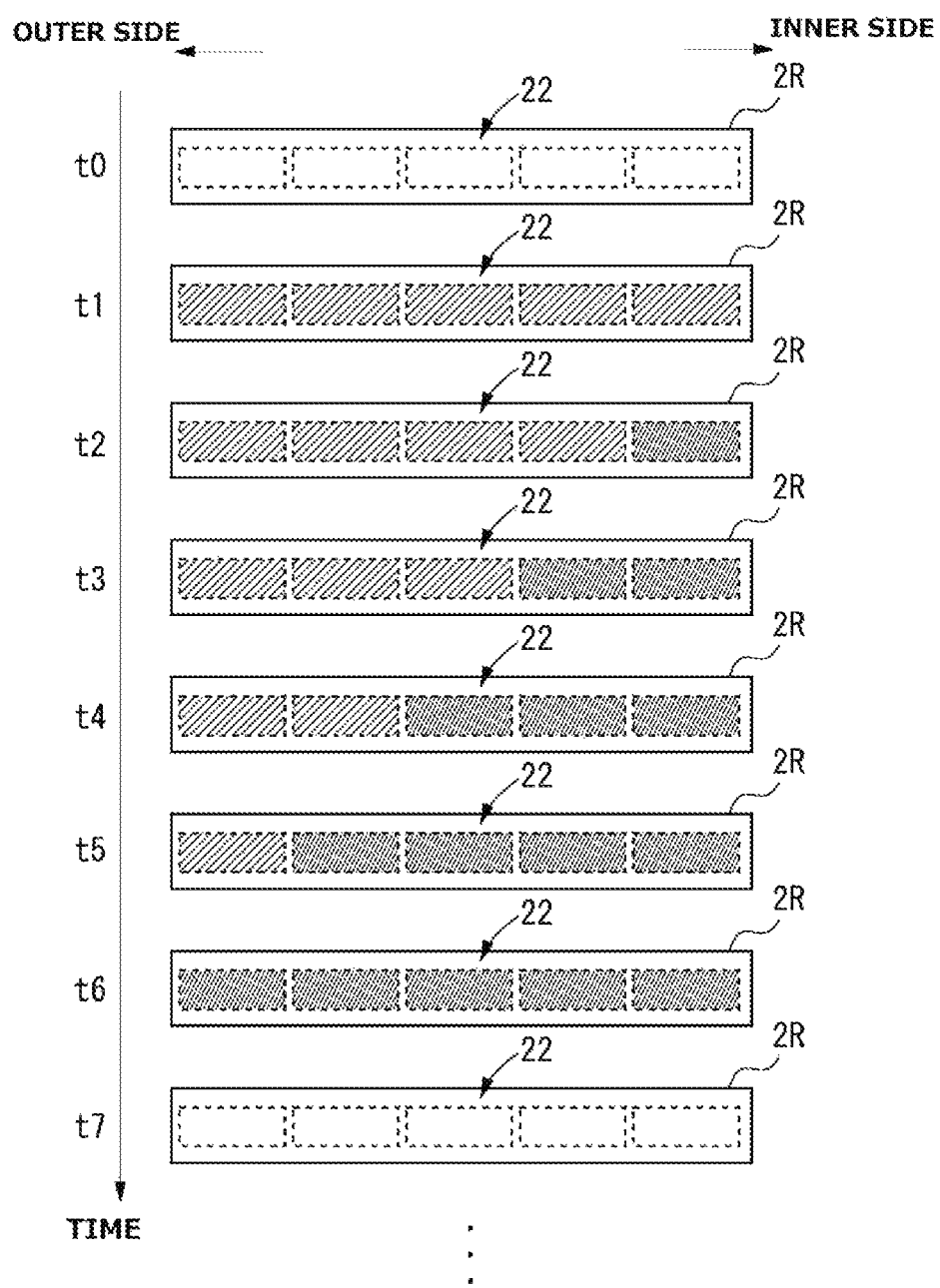

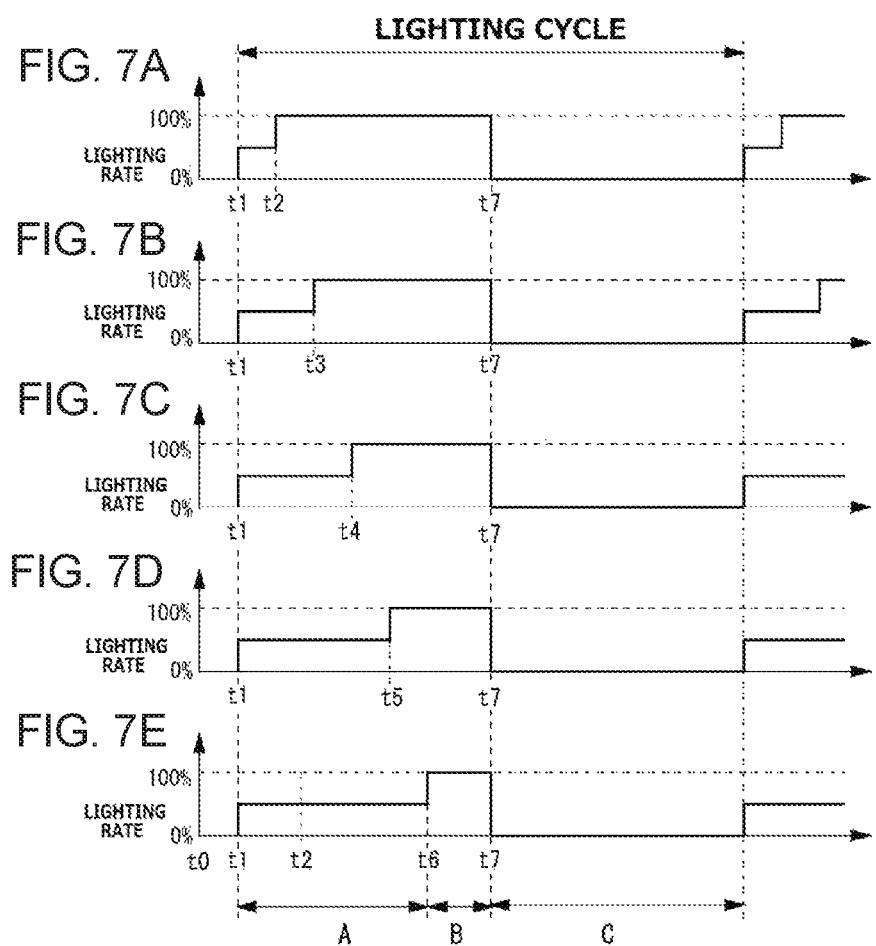

LIGHTING CONTROL DEVICE AND METHOD OF VEHICULAR LAMP, AND VEHICULAR LAMP SYSTEM

This application claims the priority benefit under 35 U.S.C. § 119 of Japanese Patent Application No. 2019-186105 filed on Oct. 9, 2019, which is hereby incorporated in its entirety by reference.

TECHNICAL FIELD

The presently disclosed subject matter relates to a vehicular lamp system used, for example, as a turn signal lamp or a direction indicator lamp.

BACKGROUND ART

As one type of a turn signal lamp used in a vehicle, there are known those having a plurality of light-emitting parts that are sequentially turned on or off with a time difference (for example, Japanese Patent No. 6066829, Japanese Patent Application Laid-Open No. 1995-335002 A). Such a lighting method is referred to herein as sequential blink or sequential winker. The vehicular indicator lamp such as a turn signal lamp described in the foregoing patent literature is controlled in such a manner that once the light-emitting parts in all areas where they are disposed are turned on so that all the areas become a lighting area, followed by sequentially turning off the light-emitting parts from the innermost one to the adjacent inner one and so on so as to widen the lights-out area from the inner side of the vehicle to the outer side. This control can perform the direction indication so that the boundary of the lighting area and the lights-out area appears to move (so-called "movement of light").

When the vehicular lamp utilizes such a control to gradually widen the lights-out area as described above, depending on the control conditions such as the speed of widening the lights-out area and the repetition period of lighting control, the impression of the direction indication by the movement of light may become poor.

SUMMARY

The presently disclosed subject matter was devised in view of these and other problems and features in association with the conventional art. According to an aspect of the presently disclosed subject matter, there is provided a technique capable of further enhancing the impression of the direction indication due to the movement of light when performing sequential winker control.

According to another aspect of the presently disclosed subject matter, a lighting control device of a vehicular lamp is a lighting control device for performing lighting control of a vehicular lamp including a plurality of light-emitting parts, comprising processor circuitry configured to perform controls to repeat a lighting cycle including turning on the plurality of light-emitting parts that have been turned off and maintaining a lighting state of all the light emitting parts, then sequentially dimming at least two or more of the light-emitting parts in a predetermined (arranged) direction with a time difference, and thereafter turning off the plurality of light-emitting parts and maintaining a lights-out state (or turned-off state) of all the light-emitting parts.

According to still another aspect of the presently disclosed subject matter, a lighting control device of a vehicular lamp is a control device for performing lighting control of a vehicular lamp including a plurality of light-emitting parts, comprising processor circuitry configured to perform controls to repeat a lighting cycle including a first period in which the plurality of light-emitting parts which have been turned off are turned on, a second period in which a lighting state of the light-emitting parts is maintained, a third period in which at least two or more of the plurality of light-emitting parts are sequentially dimmed in a predetermined (arranged) direction with a time difference, and a fourth period in which the plurality of light-emitting parts are turned off and a lights-out state of the light-emitting parts is maintained.

In the forgoing lighting control device, a value obtained by dividing a luminance of the light-emitting part being turned on as a dividend by a luminance of the light-emitting part being in a dimming state as a divisor may be set to be 1.15 or more.

In the forgoing lighting control device, the lighting rate of each of the at least two or more of the light emitting parts may gradually be decreased during dimming the at least two or more of the light emitting parts. Alternatively, the lighting rate of each of the at least two or more of the light emitting parts is decreased in a stepwise manner with the lighting rate taking two or more values during dimming the at least two or more of the light emitting parts.

In the forgoing lighting control device, the plurality of light-emitting parts that have been turned off may substantially simultaneously be turned on, namely, at the same timing.

According to still another aspect of the presently disclosed subject matter, a lighting control device of a vehicular lamp is a control device for performing lighting control of a vehicular lamp including a plurality of light-emitting parts, comprising processor circuitry configured to perform controls to repeat a lighting cycle including turning on the plurality of light-emitting parts, which have been turned off, at a first luminance and maintaining a lighting state of the light-emitting parts, sequentially changing the first luminance of at least two or more of the plurality of light-emitting units to a second luminance, which is higher than the first luminance, in a predetermined (arranged) direction with a time difference, and then turning off the plurality of light-emitting units and maintaining the lights-out state.

According to still another aspect of the presently disclosed subject natter, a lighting control method of a vehicular lamp is a control method for performing lighting control of a vehicular lamp including a plurality of light-emitting parts, comprising performing controls to repeat a lighting cycle including turning on the plurality of light-emitting parts that have been turned off and maintaining a lighting state of all the light emitting parts, then sequentially dimming at least two or more of the light-emitting parts in a predetermined (arranged) direction with a time difference, and thereafter turning off the plurality of light-emitting parts and maintaining a lights-out state of all the light-emitting parts.

According to still another aspect of the presently disclosed subject matter, a lighting control method of a vehicular lamp is a control method for performing lighting control of a vehicular lamp including a plurality of light-emitting parts, comprising performing controls to repeat a lighting cycle including a first period in which the plurality of light-emitting parts which have been turned off are turned on, a second period in which a lighting state of the light-emitting parts is maintained, a third period in which at least two or more of the plurality of light-emitting parts are sequentially dimmed in a predetermined (arranged) direction with a time difference, and a fourth period in which the plurality of light-emitting parts are turned off and a lights-out state of the light-emitting parts is maintained.

According to still another aspect of the presently disclosed subject matter, a lighting control method of a vehicular lamp is a control method for performing lighting control of a vehicular lamp including a plurality of light-emitting parts, comprising performing controls to repeat a lighting cycle including turning on the plurality of light-emitting parts, which have been turned off, at a first luminance and maintaining a lighting state of the light-emitting parts, sequentially changing the first luminance of at least two or more of the plurality of light-emitting units to a second luminance, which is higher than the first luminance, in a predetermined (arranged) direction with a time difference, and then turning off the plurality of light-emitting units and maintaining the lights-out state of the light-emitting units.

According to still further another aspect of the presently disclosed subject matter, a vehicular lamp system can include the foregoing lighting control device and a vehicular lamp controlled by the lighting control device.

According to the foregoing configurations, it is possible to further enhance the impression of the direction indications due to the movement of light when performing sequential winker controls.

BRIEF DESCRIPTION OF DRAWINGS

These and other characteristics, features, and advantages of the presently disclosed subject matter will become clear from the following description with reference to the accompanying drawings, wherein:

FIGS. 4A to 4E are each a timing chart showing a time change of the lighting rate in each of light-emitting parts of the lamp unit according to the first exemplary embodiment;

FIG. 6 is a diagram for describing the operation state of a vehicular lamp system according to a second exemplary embodiment; and FIGS. 7A to 7E are a timing chart showing a time change of the lighting rate in each of light-emitting parts of the lamp unit according to the second exemplary embodiment.

DESCRIPTION OF EXEMPLARY EMBODIMENTS

A description will now be made below to vehicular lamp systems of the presently disclosed subject matter with reference to the accompanying drawings in accordance with exemplary embodiments.

First Exemplary Embodiment

Figure 1:
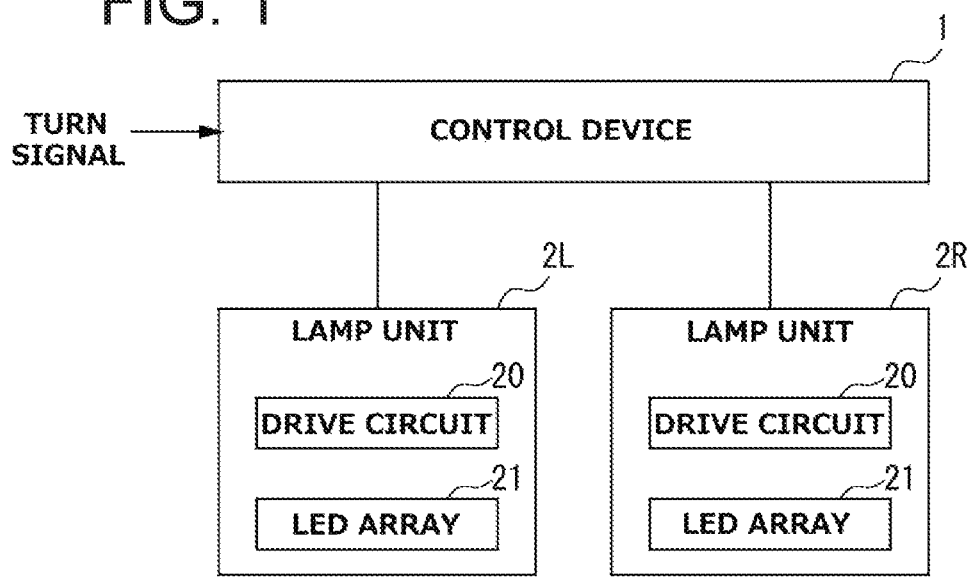
FIG. 1 is a block diagram showing a configuration of a vehicular lamp system according to a first exemplary embodiment made in accordance with principles of the presently disclosed subject matter.

FIG. 1 is a block diagram showing a configuration of a vehicular lamp system according to a first exemplary embodiment. The illustrated vehicular lamp system is configured to operate as a direction indicator lamp (turn signal lamp), and include a control device 1 and a pair of lamp units (vehicular lamps) 2L and 2R of which operation is controlled by the control device 1.

The control device 1, when a turn signal indicating that a direction indicator installed in a vehicle is operated is input thereto, controls the lighting state of any of the lamp units 2L and 2R in response to the turn signal, to illuminate light for indicating the traveling direction of the vehicle before turning.

Each of the lamp units 2L and 2R is configured to include a drive circuit 20, and an LED array 21. The lamp unit 2L is installed on the left side of the front of the vehicle while the lamp unit 2R is installed on the right side of the front of the vehicle. Note that a pair of lamp units may be similarly installed on the left and right sides of the rear of the vehicle. For simplicity of description, only a pair of lamp units 2L and 2R installed in the front of a vehicle will be described in the present exemplary embodiment.

The drive circuit 20 supplies a drive power to respective light-emitting elements (LEDs) included in the LED array 21 to turn on the respective LEDs or stop supplying of drive power to turn off the LEDs.

The LED array 21 is composed of the plurality of LEDs, each of which emits light by a drive power provided from the drive circuit 20.

Figure 2:
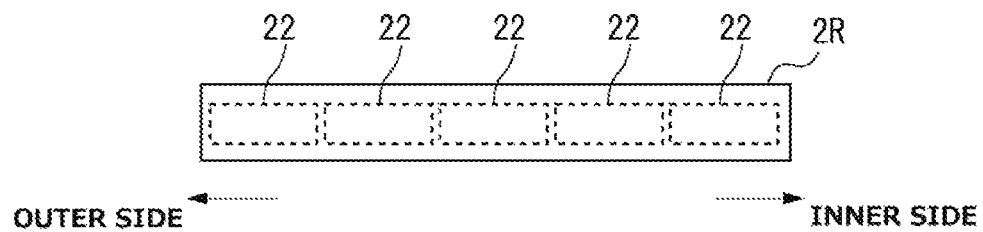
FIG. 2 is a plan view illustrating a configuration of a lamp unit of the vehicular lamp system when viewed from its front.

FIG. 2 is a plan view illustrating a configuration of the lamp unit of the vehicular lamp system when viewed from its front. Although FIG. 2 shows the lamp unit 2R, the lamp unit 2L has the same configuration symmetrical to that of the lamp unit 2R illustrated. The lamp unit 2R as illustrated includes a plurality of (five in the illustrated embodiment) light-emitting parts 22 arranged from the inner side of the vehicle (center side in the case of the lamp unit 2R) toward the outer side of the vehicle. The light-emitting parts 22 are associated with one or more of the LEDs included in the LED array 21, respectively. The respective light-emitting parts 22 can be independently turned an/off by the control of the drive circuit 20 as well as the brightness or luminance of each of the light-emitting parts 22 can be freely set by the control. In the following description, for convenience of illustration, it is assumed that the LEDs are associated with the respective light-emitting parts 22 by one-by-one correspondence.

Figure 3:
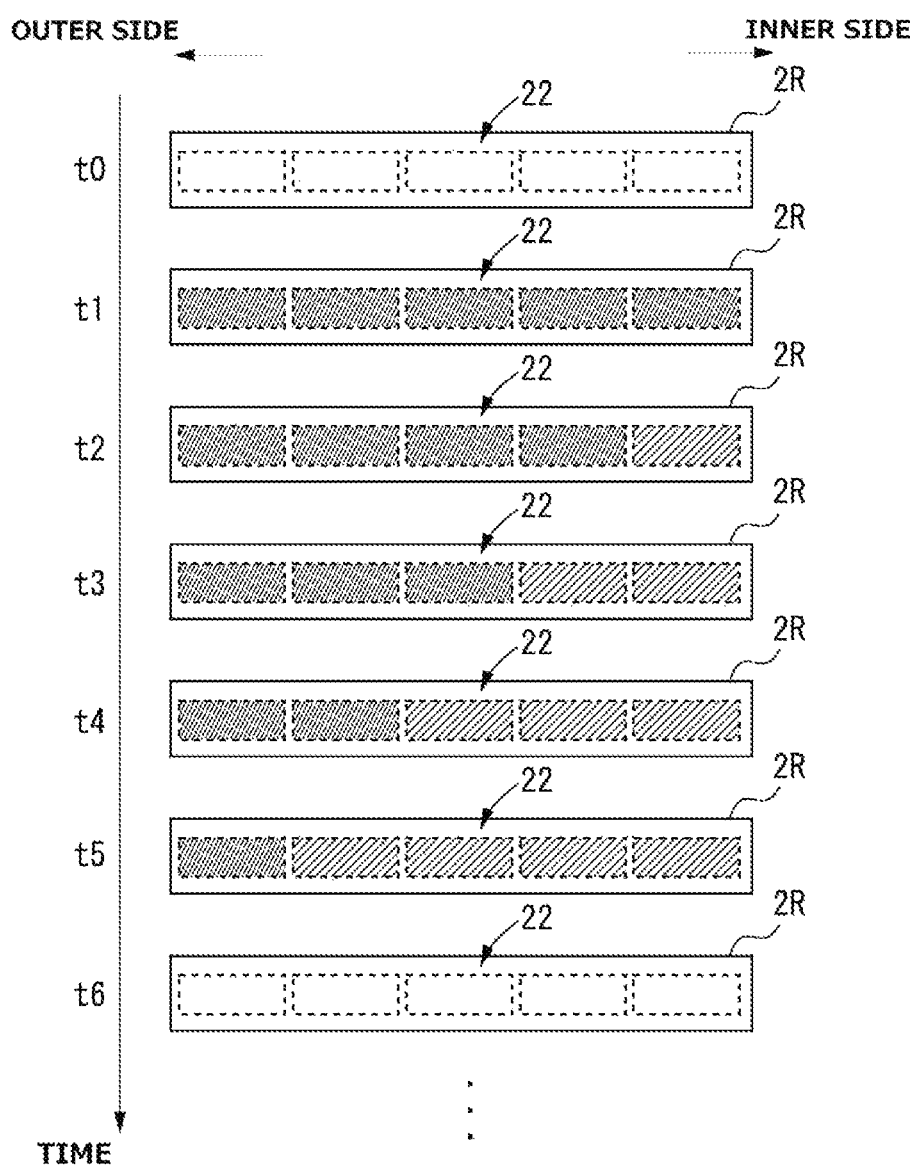
FIG. 3 is a diagram for describing the operation state of the vehicular lamp system according to the first exemplary embodiment.

FIG. 3 is a diagram for describing the operation state of the vehicular lamp system according to the first exemplary embodiment. Although only the lamp unit 2R is described in FIG. 3, the lamp unit 2L having the same symmetrical configuration can operate similarly to the lamp unit 2R. The luminance of the light is expressed by the density of the hatching in FIG. 3, and it is assumed that the higher density of the hatching indicates a state of high luminance.

When a turn signal is input at time t0, the control device 1 controls to supply a driving current to each of the light-emitting parts 22 which have been turned off until then to turn on the respective light-emitting parts 22 at time t1. Herein, the lighting rate of each of the light-emitting parts 22 is controlled to be a preset maximum value (lighting rate being 100% as an example).

After a state in which the lighting rate of each of the light-emitting parts 22 is controlled to be a maximum value is maintained for a certain period of time, the lighting rate of the first light-emitting part 22 from the vehicle inside (innermost light-emitting part 22) is controlled at time t2 to be an intermediate value between the maximum value and the minimum value (about 50% in the illustrated example).

Then, this state is maintained for a certain period of time. Similarly, the lighting rate of the second light-emitting part 22 from the vehicle inside is controlled at time t3 to be the intermediate value, the lighting rate of the third light-emitting part 22 from the vehicle inside is controlled at time t4 to be the intermediate value, and the lighting rate of the fourth light-emitting part 22 from the vehicle inside is controlled at time t5 to be an intermediate value. After that, all the light-emitting parts 22 are controlled at time t0 to be turned off After time to, a lights-out duration of a predetermined length is provided. After the lights-out duration has elapsed, the next lighting cycle starts, and the operations after time t0 are repeated. Although, in this exemplary embodiment, the outermost light-emitting part 22 has been controlled to be turned off from fully lighting without the lighting rate being controlled to take an intermediate value, a period of dimming to the intermediate value may be provided.

By the above-mentioned series of lighting and lights-out control, the direction indication display that repeats the lighting cycle is realized, where a single lighting cycle sequentially includes a state where all of the light-emitting parts 22 in the areas corresponding to the light-emitting parts 22 of the lamp unit 2R are switched from being turned off to being turned on, a state where the dimming areas in which the lighting rate of the light-emitting part 22 is controlled to be an intermediate value relatively lower than the maximum value are sequentially increased from the vehicle inside toward the vehicle outside with a time difference, a state where a dimming state of areas corresponding to all the light-emitting parts 22 except the outermost one is maintained for a certain period of time, and a state where all of the light-emitting parts 22 are turned off. That is, the lamp unit 2R is operated in such a manner that, while blinking (turning on and off) at regular intervals is repeated as a whole, the dimming area within the period of lighting is controlled to sequentially increase from the vehicle inside toward the vehicle outside. Thus, in contrast to the conventional direction indicator operation by simple blinking, it is possible to realize a display of a direction indicator in which sequential winkers of the new aspect, by increasing (like moving) the dimming area by sequentially increasing the areas of the controlled light-emitting parts are superimposed.

FIGS. 4A to 4E are each a timing chart showing a time change of the lighting rate in each light-emitting part of the lamp unit. Herein, a description will also be given of the lamp unit 2R, and the same will be applied to the lamp unit 2L. FIG. 4A is a lighting rate waveform corresponding to the outermost light-emitting part 22, FIG. 4B is a lighting rate waveform corresponding to the second light-emitting part 22 from the outside, FIG. 4C is a lighting rate waveform corresponding to the third light-emitting part 22 from the outside, FIG. 4D is a lighting rate waveform corresponding to the fourth light-emitting part 22 from the outside, and FIG. 4E is a lighting rate waveform corresponding to the innermost light-emitting part 22. Incidentally, the luminance in each light-emitting part 22 as described below can be controlled by the magnitude of the driving current given to the LED of each light-emitting part 22 from the drive circuit 20 in accordance with the control by the control device 1. Furthermore, the lighting rate corresponds to the luminance of the light emitted from each light-emitting part 22.

As shown in each figure, in the first section A, substantially simultaneously, all the light-emitting parts 22 are controlled so that the lighting rates thereof having a preset minimum value (0% as an example herein) are increased to a maximum value (100% as an example herein), and that the lighting state is maintained. In the next second section B, the lighting rate of the innermost light-emitting part 22 is first controlled to decrease to an intermediate value (50% as an example herein) (FIG. 4E). Then, the lighting rate of the second light-emitting part 22 from the inside is controlled to decrease to an intermediate value (50%) (FIG. 4D), then the lighting rate of the third light-emitting part 22 from the inside is controlled to decrease to n intermediate value (50%) (FIG. 4C), and then the lighting rate of the fourth light-emitting part 22 from the inside is controlled to decrease to an intermediate value (50%) (FIG. 4B). After that, while the lighting rate of the outermost light-emitting part 22 is controlled to decrease to the minimum value (0%) (FIG. 4A), the lighting rates of all other light-emitting parts 22 are simultaneously controlled to decrease to the minimum value (0%) (FIGS. 4B to 4E). After that, the lights-out state is maintained in the third section C. Then, the lighting cycle consisting of these first section A, second section B, and third section C is repeated.

The length of the third section C corresponding to the lights-out state can be set to, for example, the same length as the sum of the first section A and the second section B. In addition, although the intermediate value of the lighting rate of each of the light-emitting parts 22 is set to 50% as an example, the intermediate value is not limited to this. For example, assume a case where the luminance corresponding to the maximum value of the lighting rate is a dividend and the luminance corresponding to the intermediate value of the lighting rate is a divisor, and in this case the value obtained by dividing the dividend by the divisor (maximum value/ intermediate value) can be set to be 1.15 or more. By doing so, it is possible to more easily recognize the movement of light controlled. The same aspect can also be applied to a second exemplary embodiment to be described later.

Figure 5A:
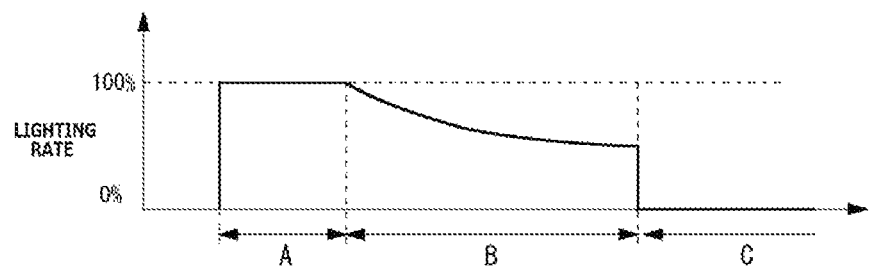
FIGS. 5A and 5B are each a waveform diagram for describing a modification of the time change of the lighting rate in each light-emitting part.
Figure 5B:
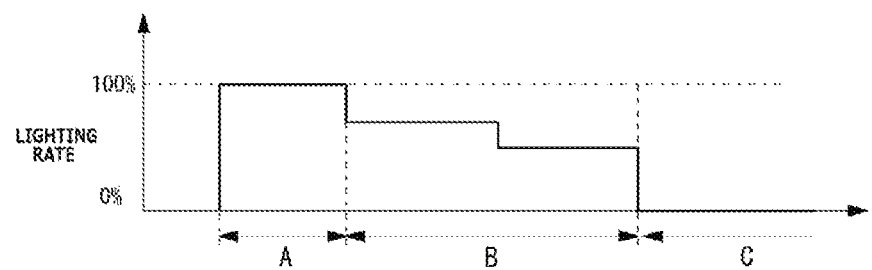

Further, in the first exemplary embodiment described above, the luminance is instantaneously reduced to achieve a rectangular wave shape when the light-emitting parts 22 are successively dimmed in the second section B, but the aspect of luminance reduction is not limited to this. For example, the luminance reduction may be controlled to be gradually reduced as a curved change as exemplified in FIG. 5A. In this case, for example, a curve-like change such as those represented by an exponential function or a sigmoidal function can be used. In addition, as illustrated in FIG. SB, two or more different intermediate values may be set as intermediate values of luminance to gradually lower the luminance in a stepwise manner. In addition, curve-like and stepwise changes in luminance may be combined. In the above-described exemplary embodiment, the dimming area is moved in the direction from the inside of the vehicle to the outside of the vehicle, but the direction may be reversed.

As an example, the effects of the present exemplary embodiment had been verified by means of a vehicular lamp system in which the first section A was set to 133 msec, the second section B was set to 200 msec, and the third section C was set to 333 msec. As a comparative example, there was used a comparative vehicular lamp system in which the lengths of respective sections are set to be the same as each other and which is configured to sequentially turn off each of the light-emitting parts 22 with a time difference without providing an intermediate value for the lighting rate. When the operation of each of the vehicular lamp systems of Example and Comparative Example was evaluated by 10 subjects, the result was obtained such that 10 subjects felt the impression of direction indication more strongly by fight from the vehicular lamp system of Example.

Second Exemplary Embodiment

In the first exemplary embodiment described above, the direction indication display by moving sequentially increasing the dimming area after lighting all of the light-emitting parts 22, the direction indication display can be achieved by sequentially increasing the lighting area to appear to move after all of the light-emitting part 22 are controlled in a dimmed state. Hereinafter, such an exemplary embodiment will be described. Since the configuration of the vehicular lamp system is the same as the first exemplary embodiment (see FIGS. 1 and 2), the description thereof will be omitted here.

FIG. 6 is a diagram for describing the operation state of the vehicular lamp system according to the second exemplary embodiment. Herein, a description will also be given of the lamp unit 2R, and the same will be applied to the lamp unit 2L because of bilateral symmetry. The luminance of the light is expressed by the density of the hatching in FIG. 6, and it is assumed that the higher density of the hatching indicates a state of high luminance.

When a turn signal is input at time t0, the control device 1 controls to supply a driving current to each of the light-emitting parts 22 which have been turned off until then to turn on the respective light-emitting parts 22 at time t1. Herein, the lighting rate of each of the light-emitting parts 22 is controlled to be a preset intermediate value (lighting rate being 50% as an example). That is, the respective light-emitting parts 22 are controlled to be in a dimmed state. Herein, the dimmed state at the intermediate value corresponds to "lighting at the first luminance", and the lighting state at the maximum value corresponds to "lighting at the second luminance".

After a state in which the lighting rate of each of the light-emitting parts 22 is controlled to be an intermediate value is maintained for a certain period of time, the lighting rate of the first light-emitting part 22 from the vehicle inside at time t2 is controlled to be a maximum value (100% in the example shown), and this state is maintained. Similarly, the lighting rate of the second light-emitting part 22 from the vehicle inside is controlled at time t3 to be the maximum value, the lighting rate of the third light-emitting part 22 from the vehicle inside is controlled at time t4 to be the maximum value, the lighting rate of the fourth light-emitting part 22 from the vehicle inside is controlled at time t5 to be the maximum value, and the lighting rate of the light-emitting part 22 from the vehicle outside (outermost one) is controlled at time t6 to be the maximum value. After that, all the light-emitting parts 22 is controlled at time t7 to be turned off. After time t7, a lights-out duration of a predetermined length is provided. After the lights-out duration has elapsed, the next lighting cycle starts, and the operations after time t0 are repeated. Although, in this exemplary embodiment, the inner light-emitting part 22 from the vehicle inside has been controlled to be turned on at maximum lighting rate after taking an intermediate lighting rate, a period of dimming to the intermediate value may be provided. In this case, the state at time t2 may be achieved after the state at the time t0 shown in FIG. 6.

By the above-mentioned series of lighting and lights-out control, the direction indication display that repeats the lighting cycle is realized, where a single lighting cycle sequentially includes a state where all of the light-emitting parts 22 in the areas corresponding to the light-emitting parts 22 of the lamp unit 2R are switched from being turned off to being turned on in a dimming state, a state where the lighting areas in which the lighting rate of the light-emitting part 22 controlled to be the maximum value ares sequentially increased from the vehicle inside toward the vehicle outside with a time difference, a state where the lighting state of areas corresponding to all the light-emitting parts 22 is maintained for a certain period of time, and a state where all of the light-emitting parts 22 are turned off. That is, the lamp unit 2R is operated in such a manner that, while blinking (turning on in a dimming state and off) at regular intervals is repeated as a whole, the lighting area within the period of the dimming state is controlled to sequentially increase from the vehicle inside toward the vehicle outside. Thus, in contrast to the conventional direction indicator operation by simple blinking, it is possible to realize a display of a direction indicator in which sequential winkers of the new aspect by moving the lighting area by sequentially increasing the areas of the controlled light-emitting parts are superimposed.

FIGS. 7A to 7E are each a timing chart showing a time change of the lighting rate in each light-emitting part of the lamp unit. Herein, a description will also be given of the lamp unit 2R, and the same will be applied to the lamp unit 2L. FIG. 7A is a lighting rate waveform corresponding to the innermost light-emitting part 22, FIG. 7B is a lighting rate waveform corresponding to the second light-emitting part 22 from the inside, FIG. 7C is a lighting rate waveform corresponding to the third light-emitting part 22 from the inside, FIG. 7D is a lighting rate waveform corresponding to the fourth light-emitting part 22 from the inside, and FIG. 7E is a lighting rate waveform corresponding to the outermost light-emitting part 22. Incidentally, the luminance in each light-emitting part 22 as described below can be controlled by magnitude of the driving current given to the LED of each light-emitting part 22 from the drive circuit 20 in accordance with the control by the control device 1. Furthermore, the lighting rate corresponds to the luminance of the light emitted from each light-emitting part 22.

As shown in each figure, in the first section A, substantially simultaneously, all the light-emitting parts 22 are controlled so that the lighting rates thereof having a preset minimum value (0% as an example herein) are increased to an intermediate value (50% as an example herein), and that the dimming state is maintained. Next, the lighting rate of the innermost light-emitting part 22 is controlled to increase to the maximum value (100% as an example herein) (FIG. 7A). Then the lighting rate of the second light-emitting part 22 from the inside is controlled to increase to the maximum value (100%) (FIG. 7B), then the lighting rate of the third light-emitting part 22 from the inside is controlled to increase to the maximum value (100%) (FIG. 7C), then the lighting rate of the fourth light-emitting part 22 from the inside is controlled to increase to the maximum value (100%) (FIG. 4D), and then the lighting rate of the outermost light-emitting part 22 is controlled to increase to the maximum value (100%) (FIG. 4E). After that, in the second section B, after the lighting rates of all the light-emitting parts 22 are maintained at the maximum value for a fixed period of time, the lighting rates are controlled to decrease to a minimum value (FIG. 7B to FIG. 7E). After that, the lights-out state is maintained in the third section C. Then, the lighting cycle consisting of these first section A, second section B, and third section C is repeated.

The length of the third section C corresponding to the lights-out state can be set to, for example, can be the same length as the sum of the first section A and the second section B. In addition, although the intermediate value of the lighting rate of each of the light-emitting parts 22 is set to 50% as an example, the intermediate value is not limited to this. For example, assume a case where the luminance corresponding to the maximum value of the lighting rate is a dividend and the luminance corresponding to the intermediate value of the lighting rate is a divisor, and in this case the value obtained by dividing the dividend by divisor (maximum value/intermediate value) can be set to be 1.15 or more. By doing so, it is possible to more easily recognize the movement of light controlled.

Similarly to the second exemplary embodiment described above, the change in increasing the lighting rate of each of the light-emitting parts 22 sequentially from the intermediate value to the maximum value may be controlled as a curved change such as those represented by an exponential function or a sigmoid function. In addition, two or more different intermediate values may be set as intermediate values of luminance to gradually lower the luminance in a stepwise manner. In addition, curve-like and stepwise changes in luminance may be combined. In the above-described exemplary embodiment, the dimming area is moved in the direction from the inside of the vehicle to the outside of the vehicle, but the direction may be reversed.

According to the foregoing exemplary embodiments, while the conventional direction indicator operation by simple blinking is maintained as a whole, it is possible to realize a display of a direction indicator in which sequential winkers of the new aspect by moving the dimming area or lighting area by sequentially increasing the areas of the controlled light-emitting parts are superimposed. This makes it possible to further enhance the impression of the direction indication due to the movement of light when performing sequential winker control.

Further, since the movement of the dimming area is considered as a so-called apparent movement, it is possible to further increase the perception and noticeability for the direction indication display without lowering the luminance so large. Further, the movement of the dimming area or the like can enhance the instantaneous perception from all viewing angles, and realize a new appearance with a good impression.

In addition, it is possible to confirm the lighting state instantaneously at all viewing angles of the light distribution range in comparison with the conventional sequential winkers. For this reason, for example, even if a part of the lamp unit is shielded by a shield, for example, a two-wheeled vehicle, the turn signal lamp can be easily confirmed.

Further, since the light-emitting parts blink collectively as a whole, the entire parts including the respective light-emitting parts are recognized as one group. This is due to the law of common fate in Gestalt psychology. Since the movement, or apparent movement, of the dimming areas or the like is performed in the area recognized as the group, the movement of the dimming areas or the like does not hinder the recognition of the blinking action of the entire group.

The presently disclosed subject matter s not limited to the contents of the foregoing exemplary embodiments, and can be variously modified and implemented within the scope of the gist of the presently disclosed subject matter. For example, although the presently disclosed subject matter is applied to a vehicular lamp system used as a turn signal lamp in the respective exemplary embodiments described above, the scope of application of the presently disclosed subject matter is not limited to this, and the presently disclosed subject matter can be applied to various vehicular lamp systems mounted on a vehicle and irradiating light to the periphery thereof. For example, in the exemplary embodiment described above, the lamp units 2L and 2R are selectively operated in response to a turn signal, but when a hazard signal is the lamp units 2L and 2R may be simultaneously operated by the control method described above.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A lighting control device for performing lighting control of a vehicular lamp including a plurality of light-emitting parts, comprising processor circuitry configured to perform controls to repeat a lighting cycle including substantially simultaneously turning on the plurality of light-emitting parts that have been turned off and maintaining a lighting state of all the light emitting parts, then sequentially dimming at least two or more of the light-emitting parts in a predetermined direction with a time difference so that a lighting rate of each of the light-emitting parts is controlled to be an intermediate value between a maximum value and a minimum value and is maintained, and thereafter turning off the plurality of light-emitting parts and maintaining a lights-out state of all the light-emitting parts.

2. The lighting control device according to claim 1, wherein a value obtained by dividing a luminance of the light-emitting part being turned on as a dividend by a luminance of the light-emitting part being in a dimming state as a divisor is set to be 1.15 or more.

3. The lighting control device according to claim 1, wherein a lighting rate of each of the at least two or more of the light emitting parts is gradually decreased during dimming the at least two or more of the light emitting parts.

4. The lighting control device according to claim 1, wherein a lighting rate of each of the at least two or more of the light emitting parts is decreased in a stepwise manner with the lighting rate taking two or more values during dimming the at least two or more of the light emitting parts.

5. A vehicular lamp system comprising the lighting control device according to claim 1, and a vehicular lamp controlled by the lighting control device.

6. A lighting control device for performing lighting control of a vehicular lamp including a plurality of light-emitting parts, comprising processor circuitry configured to perform controls to repeat a lighting cycle including a first period in which the plurality of light-emitting parts which have been turned off are substantially simultaneously turned on, a second period in which a lighting state of the light-emitting parts is maintained, a third period in which at least two or more of the plurality of light-emitting parts are sequentially dimmed in a predetermined direction with a time difference so that a lighting rate of each of the light-emitting parts is controlled to be an intermediate value between a maximum value and a minimum value and is maintained, and a fourth period in which the plurality of light-emitting parts are turned off and a lights-out state of the light-emitting parts is maintained.

7. The lighting control device according to claim 6, wherein a value obtained by dividing a luminance of the light-emitting part being turned on as a dividend by a luminance of the light-emitting part being in a dimming state as a divisor is set to be 1.15 or more.

8. The lighting control device according to claim 6, wherein a lighting rate of each of the at least two or more of the light emitting parts is gradually decreased during dimming the at least two or more of the light emitting parts.

9. The lighting control device according to claim 6, wherein a lighting rate of each of the at least two or more of the light emitting parts is decreased in a stepwise manner with the lighting rate taking two or more values during dimming the at least two or more of the light emitting parts.

10. A vehicular lamp system comprising the lighting control device according to claim 6, and a vehicular lamp controlled by the lighting control device.

11. A lighting control device for performing lighting control of a vehicular lamp including a plurality of light-emitting parts, comprising processor circuitry configured to perform controls to repeat a lighting cycle including substantially simultaneously turning on the plurality of light-emitting parts, which have been turned off, at a first luminance and maintaining a lighting state of the light-emitting parts, sequentially changing the first luminance of at least two or more of the plurality of light-emitting units to a second luminance, which is higher than the first luminance, in a predetermined direction with a time difference, and then turning off the plurality of light-emitting units and maintaining the lights-out state.

12. A lighting control method for performing lighting control of a vehicular lamp including a plurality of light-emitting parts, comprising performing controls to repeat a lighting cycle including substantially simultaneously turning on the plurality of light-emitting parts that have been turned off and maintaining a lighting state of all the light emitting parts, then sequentially dimming at least two or more of the light-emitting parts in a predetermined direction with a time difference so that a lighting rate of each of the light-emitting parts is controlled to be an intermediate value between a maximum value and a minimum value and is maintained, and thereafter turning off the plurality of light-emitting parts and maintaining a lights-out state of all the light-emitting parts.

13. A lighting control method for performing lighting control of a vehicular lamp including a plurality of light-emitting parts, comprising performing controls to repeat a lighting cycle including a first period in which the plurality of light-emitting parts which have been turned off are substantially simultaneously turned on, a second period in which a lighting state of the light-emitting parts is maintained, a third period in which at least two or more of the plurality of light-emitting parts are sequentially dimmed in a predetermined direction with a time difference so that a lighting rate of each of the light-emitting parts is controlled to be an intermediate value between a maximum value and a minimum value and is maintained, and a fourth period in which the plurality of light-emitting parts are turned off and a lights-out state of the light-emitting parts is maintained.

14. A lighting control method for performing lighting control of a vehicular lamp including a plurality of light-emitting parts, comprising performing controls to repeat a lighting cycle including substantially simultaneously turning on the plurality of light-emitting parts, which have been turned off, at a first luminance and maintaining a lighting state of the light-emitting parts, sequentially changing the first luminance of at least two or more of the plurality of light-emitting units to a second luminance, which is higher than the first luminance, in a predetermined direction with a time difference, and then turning off the plurality of light-emitting units and maintaining the lights-out state of the light-emitting units.

* * * * *